Patented Sept. 2, 1924.

1,507,152

UNITED STATES PATENT OFFICE.

EDWARD SALOMON BERGLUND, OF DJURSHOLM, SWEDEN.

METHOD FOR TREATING MATERIALS CONTAINING METAL COMPOSITIONS.

No Drawing. Application filed March 20, 1922. Serial No. 545,340.

To all whom it may concern:

Be it known that I, EDWARD SALOMON BERGLUND, a subject of the King of Sweden, resident of Djursholm, Sweden, have invented certain new and useful Improvements in Method for Treating Materials Containing Metal Compositions, of which the following is a specification.

The extraction of metals from so called complex ores, which contains zinc and lead and sometimes also copper, nickel and cobalt, has hitherto been very difficult and this fact is due to many reasons. Very often the values are so finely distributed in the ore, that the ore must be crushed very finely for separating them, which operation is very expensive, and moreover this results in great losses of metal.

To utilize the ores, without separating the metal compositions by enriching the ore, is also very difficult.

Roasting a complex ore so as to diminish the content of sulphur in any desirable degree is only executed with difficulty and moreover such roasting is too expensive. High temperatures are necessary for this purpose, with consequent great fuel costs and great losses of metal. Moreover expensive furnaces are necessary and the work is dangerous, and the results are not satisfactory. The removing of the last percentages of sulphur especially occasions the greatest expense and the greatest losses of metal.

If a roasted lead ore contains a considerable content of zinc, great disadvantages arise in smelting the ore, using the ordinary methods, and the content of zinc is lost in lead smelting methods hitherto employed.

A zinc ore, containing a considerable content of lead cannot be treated with the ordinary retort method, as the retorts are damaged, owing to the fact that the coke generated by the superfluous amount of carbon, is unable to absorb the whole amount of lead, so that part of the lead collects on the bottom of the retort.

It is not recommended to smelt the complex ores without roasting according to the usual methods. If a zincous lead ore is treated according to the so called precipitation method, by which the unroasted ore is smelted in a shaft furnace together with iron or iron-ore and carbon, the content of zinc will occasion still greater difficulties, than when roasted ore is smelted and reduced with carbon. The matte, which is produced by the iron will form double sulphides in the presence of zinc sulphide and lead sulphide, and the zinc sulphide makes the matte as well as the slag very refractory. Moreover as the matte is very heavy, lead and lead matte settle from the same only with difficulty. All these facts result in great losses of lead.

It will be clear from the above mentioned facts that it is desirable to find out a smelting process, by means of which the difficulties, occasioned when smelting an unroasted complex ore, may be overcome or diminished, so that separating and roasting may be obviated wholly or partly.

The present invention has for its object to provide such a process and apparatus for carrying out the same. The process is employable for treating complex zinc-lead ores, not separated and partly roasted or completely unroasted, and also for treating mattes. For carrying out the smelting process an electric furnace is preferably employed if the metals are extracted in the form of metal or metallic powder. If the metals on the contrary are extracted in the form of oxides a common reverberatory furnace heated by gaseous fuel may be employed.

The method consists therein that a mixture of calcium carbide and lime, or calcium carbide, lime and carbon, dependent of the degree in which the ores or mattes to be smelted contain oxygen or sulphur, is used for the reduction of the metals.

A generic formula of the reactions taking place when smelting a complex zinc and lead ore is the following:—

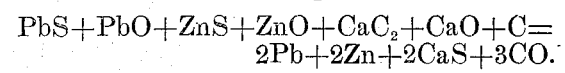
$$PbS+PbO+ZnS+ZnO+CaC_2+CaO+C= 2Pb+2Zn+2CaS+3CO.$$

By using this method several advantages are gained. In cases when the ores are suitable for the manufacturing of sulphuric acid, and when the conditions for such a manufacture are available, that part of the sulphur, which is easiest driven off and which gives the highest concentration of sulphur dioxide, may be vapourized by a simple and cheap roasting process, after which the ore in accordance with analysis made is mixed with calcium carbide and lime, or calcium carbide, lime and carbon, in proportions required for the reduction operation. A very significant advantage which is obtained by the employment of this method, consists therein that on smelting the zinc containing ores, a smaller amount of diluting carbon monoxide and carbon dioxide gases is generated, whereby the condensation of the zinc vapours is executed easier and with a better result, than when only carbon alone is employed for the reduction operation.

Of course the process is employable also for practically pure ores of zinc and lead.

The calcium sulphide generated during the smelting process constitutes a valuable by-product, which may be employed if desired for manufacturing sulphur.

When treating complex zinc and lead ores, containing a great amount of lead, it is sometimes an advantage first to extract the greatest content of the lead and thereafter to treat the residues separately, said residues mainly consisting of zinc ore. For this purpose the present method may be employed. Briquettes are made from the ore, preferably mixed with the necessary amount of calcium-carbide and lime, or calcium carbide, lime and carbon, and the briquettes are then heated only to such a temperature that part of the lead is reduced and liquefies, whereas no appreciable part of the zinc is reduced at the temperature employed.

For carrying out the lead reduction process a channel furnace, through which the briquettes are transported piled up on a carriage, may be employed. In the bottom of the carriage a recess is provided, in which the liquefied lead is collected. The furnace preferably employed is an electric furnace provided with electric resistance elements for its heating, as in such case the temperature can easily be kept within the desired limits, but the furnace may also be heated by inert or reducing gases.

The treatment of the ores in form of briquettes is also convenient in other cases. If the minerals are very refractory, so that they require a great amount of heat and high temperatures occasioning heavy repairs of the furnace, the ore together with calcium carbide, lime and carbon in necessary and calculated proportions, may be formed into briquettes, and said briquettes are heated in a channel furnace, so as to reduce the metals, whereby part of the lead liquefies, whereas the remainder is volatilized and escapes together with the zinc vapours, and is collected. The remaining part of the charge is not smelted. The channel furnace in this case is provided with an escape for the zinc and lead vapours, and with a condenser for said vapours or with a device for collecting oxides, produced from the vapours.

The method is also employable for complex sulphide ores, containing two or more of the metals zinc, lead, copper, nickel or cobalt or mattes, containing one or more of said metals.

Having now described my invention what I claim and desire to secure by Letters Patent is:—

1. The method of treating materials containing zinc and lead, consisting in reducing said materials by means of calcium carbide and lime.

2. The method of treating materials containing zinc and lead compositions, consisting in heating the charge, mixed with calcium carbide and lime, to a temperature at which the lead compositions, but not the zinc compositions, are reduced.

3. The method of treating refractory zinc-lead ores, consisting in heating the ore, mixed with calcium carbide and lime, to a temperature at which the metals are reduced, while the remaining charge is not smelted.

4. The method of treating sulphide ores, containing zinc and lead, consisting in roasting the ore, driving off sulphur contained therein, thereafter mixing the remaining ore with calcium carbide and lime, and heating the mixture to the reducing temperature of the metal compositions, contained in the charge.

5. The method of treating materials, containing zinc and lead compositions, consisting in forming briquettes from the material, mixed with calcium carbide and lime, and heating the briquettes to a temperature at which the lead compositions, but not the zinc compositions, are reduced.

6. The method of treating sulphide ores containing zinc and lead consisting in partially roasting the ore, mixing the remaining ore with calcium carbide, lime and carbon, and heating the mixture to the reducing temperature of the metal compositions contained in the charge.

7. The method of treating materials containing zinc and lead, consisting in reducing said materials by means of calcium carbide, lime and carbon.

In testimony whereof I have signed my name to this specification in the presence of two subscribing witnesses.

EDWARD SALOMON BERGLUND.

Witnesses:
    INEZ SWENSON,
    WALDEMAR BOMAN.